United States Patent [19]

Mayer et al.

[11] 4,054,743
[45] Oct. 18, 1977

[54] FLUID ASSISTED INSTALLATION OF ELECTRICAL CABLE ACCESSORIES

[75] Inventors: Robert W. Mayer, Independence Township, Warren County; Frank A. Silva, Basking Ridge, both of N.J.

[73] Assignee: Amerace Corporation, New York, N.Y.

[21] Appl. No.: 577,555

[22] Filed: May 14, 1975

[51] Int. Cl.² ............... H01R 43/00; H02G 15/00; B23P 11/02
[52] U.S. Cl. ..................... 174/135; 29/235; 29/450; 29/628; 174/10; 174/73 R; 174/84 R
[58] Field of Search ............. 174/10, 73 R, 73 SC, 174/135, 84 R; 29/628, 450, 234, 235, 236

[56] References Cited

U.S. PATENT DOCUMENTS

| | | | |
|---|---|---|---|
| 1,608,206 | 11/1926 | Freedlander | 29/235 X |
| 2,090,014 | 8/1937 | Wiltse | 29/450 |
| 2,320,553 | 6/1943 | Barnes et al. | 29/236 |
| 3,022,573 | 2/1962 | Bullock | 29/235 |
| 3,138,859 | 6/1964 | Edwards | 29/450 |
| 3,718,749 | 2/1973 | Cunningham | 174/10 X |

Primary Examiner—Laramie E. Askin
Attorney, Agent, or Firm—S. Michael Bender

[57] ABSTRACT

An electrical cable accessory includes a generally tubular member of elastomeric material which is to be installed by placement over a cylindrical surface to grip the cylindrical surface, when in appropriate assembled relation therewith, with a predetermined gripping force established by dilation of the tubular member, the installation being facilitated by introducing fluid under pressure, through means provided in the tubular member, between the tubular member and the cylindrical surface, and simultaneously impeding the escape of the fluid under pressure from between the tubular member and the cylindrical surface by means adjacent one of the ends of the tubular member to cause dilation of the tubular member and establish a fluid layer between the tubular member and the cylindrical surface, thereby reducing the gripping force during installation.

24 Claims, 7 Drawing Figures

FLUID ASSISTED INSTALLATION OF ELECTRICAL CABLE ACCESSORIES

This invention resulted from work done under Contract No. E(49-18)-1559 with the Energy Research and Development Administration.

The present invention relates generally to the construction of electrical cable accessories, such as terminators and electrical connectors, and the installation of such accessories at the terminal end of an electrical cable. More specifically, the invention pertains to an arrangement enabling fluid assisted installation of an electrical cable accessory at the terminal end of a cable, including the assembly of electrical connectors of the type having interfitting component parts, at least one of which is a tubular member of elastomeric material which is to be fitted over a complementary cylindrical surface.

In recent years, having emphasis has been placed upon the development of underground electrical power distribution systems, especially in light industrial, commercial and residential areas. Various power distribution components, such as electrical cables, transformers and cable accessories, including terminators and electrical connectors, have been evolved for use in such systems.

Among these components, cable accessories, such as terminators and electrical connectors, have been developed which are installed in the field at the terminal ends of electrical cables so as to facilitate the construction and installation of underground power distribution systems. For the most part, these cable accessories are fitted over the cable ends, or the component parts of the accessory are fitted together, in an interference fit between a generally tubular member of elastomeric material and a cylindrical surface over which the tubular member is placed. The appropriate interference fit will establish a gripping force between the interfitted elements suitable for attaining and maintaining both the mechanical and electrical integrity of the assembly.

Initially, the interfitted elements were small enough for simple hand assembly — manual forces being great enough to overcome the resistance to establish a suitable interference fit. As the need grew for distribution systems capable of handling increased power at higher voltages, the accessories became larger, the component parts were made with concomitantly thicker wall sections and the forces required to interfit the parts became greater. Mechanical assistance was employed in the form of lever-type tools. Now, it has become feasible to manufacture even larger accessories with still heavier construction for handling still greater amounts of power at even higher voltages and the installation forces necessary to assemble the accessories by interfitting parts in an interference fit have become still greater.

It is therefore an object of the invention to provide electrical cable accessories having means for facilitating installation of the accessories upon cables.

Another object of the invention is to provide a method by which the installation of electrical cable accessories is facilitated.

A further object of the invention is to provide electrical cable accessories, such as terminators and electrical connectors, having means for enabling fluid assisted installation or assembly for overcoming the relatively large forces necessary heretofore in installing or assembling such accessories upon cables in the field.

A still further object of the invention is to render practical the fabrication of larger electrical cable accessories for installation or assembly in the field by virtue of making available method and means for accomplishing installation or assembly of the accessories with relative ease.

Another object of the invention is to provide electrical cable accessories having a construction which does not depart radically from the presently accepted construction of accessories of the same type, but which incorporate means for facilitating installation or assembly of the accessories upon a cable, particularly, in the field.

The above objects, as well as still further objects and advantages, are attained by the invention which may be described briefly as providing, in an electrical cable accessory having a tubular member of elastomeric material which is to be installed over a cylindrical surface to grip the cylindrical surface, when in appropriate assembled relation therewith, with a predetermined gripping force established by dilation of the tubular member, the tubular member having opposite ends, the improvement comprising means in the tubular member for enabling the introduction of fluid under pressure between the tubular member and the cylindrical surface to reduce the gripping force during installation of the tubular member over the cylindrical surface, and means adjacent at least one end of the tubular member for impeding the escape of the fluid from between the tubular member and the cylindrical surface at one end.

The invention will be more fully understood, while still further objects and advantages will become apparent, by reference to the following detailed description of embodiments of the invention illustrated in the accompanying drawing, in which.

Figure 6:
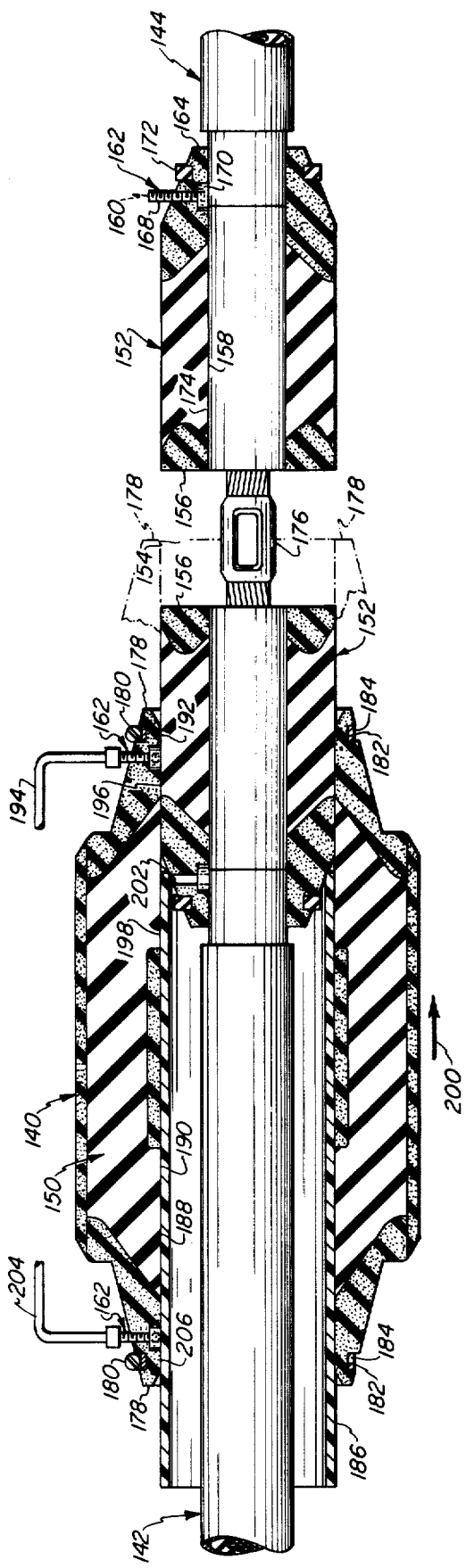
Figure 7:
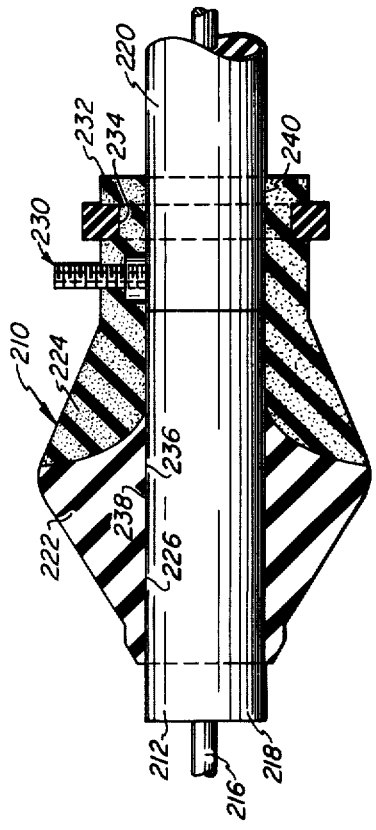

FIG. 6 is a longitudinal cross-sectional view of an electrical cable accessory in the form of another splice connector constructed and being assembled and installed at the terminal ends of a pair of electrical cables, all in accordance with the invention; and FIG. 7 is a longitudinal cross-sectional view of an electrical cable accessory in the form of a terminator constructed in accordance with the invention and installed at the terminal end of a cable.

Figure 1:
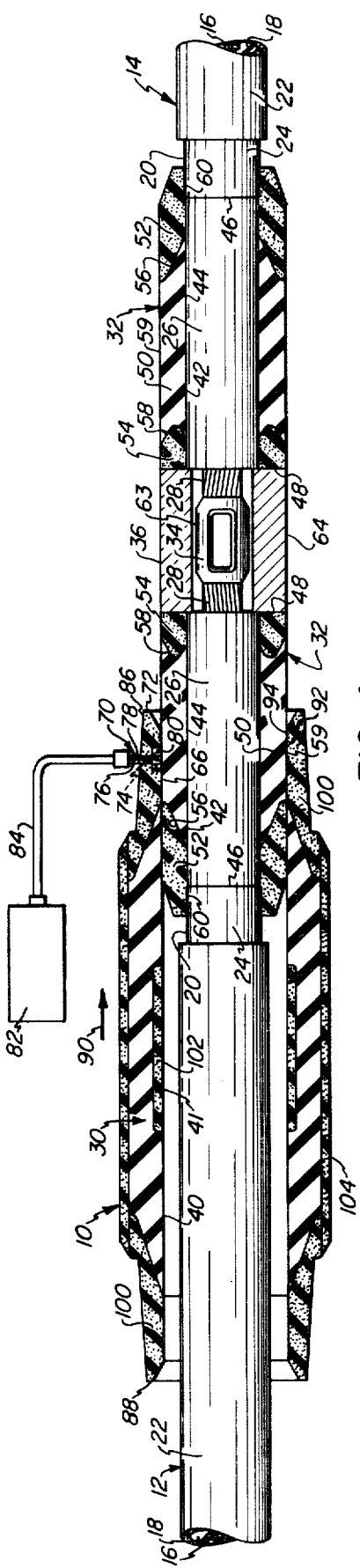
FIG. 1 is a longitudinal cross-sectional view of an electrical cable accessory in the form of a splice connector constructed and being assembled and installed at the terminal ends of a pair of electrical cables, all in accordance with the invention.
Figure 2:
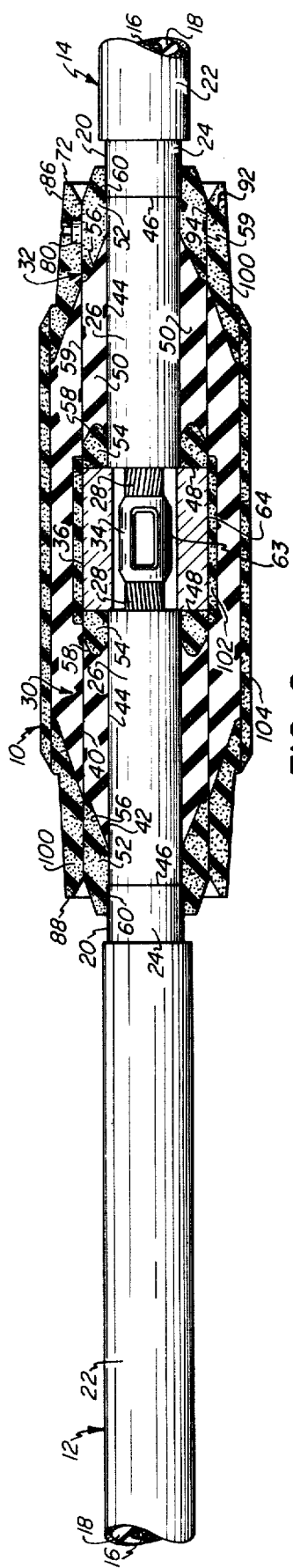
FIG. 2 is a longitudinal cross-sectional view of the splice connector of FIG. 1 assembled and installed.

Referring now to the drawing, and especially to FIGS. 1 and 2 thereof, an electrical cable accessory in the form of a splice connector constructed in accordance with the invention is illustrated at 10 and is seen being assembled and installed in accordance with the invention at the terminal ends of a pair of high voltage electrical cables 12 and 14 to establish a splice connection between the cables. Cables 12 and 14 each have a central conductor 16 surrounded by insulation 18 which, in turn, is surrounded by a conductive shield 20 and an outer cover 22. A portion of cover 22 has been removed adjacent the terminal end of each cable to expose a length 24 of shield 20, a portion of shield 20 has been removed to expose a length 26 of insulation 18, and a portion of the insulation 18 has been removed at the terminus of each cable to bare a terminal portion 28 of each conductor 16.

The component parts of the splice connector 10 include an outer housing 30, a pair of adaptor sleeves 32, an electrical contact element in the form of a metallic ferrule 34 and a heat transfer jacket 36. After preparation of the terminal ends of cables 12 and 14 to expose lengths 24 of shield 20 and lengths 26 of insulation 18 and to bare a portion 28 of each conductor 16, the component parts of the splice connector are assembled as follows.

Housing 30, which has an internal bore 40 having an internal surface 41 with a diameter greater than the outer diameter of either cable 12 or 14, is slipped over the end of either one of the cables (in this instance cable 12) and is moved along the cable to be temporarily located away from the end of the cable in the direction along the cable. Such movement will meet with little resistance since bore 40 has a larger diameter than the cable. An adaptor sleeve 32 is then installed on each cable. Each adaptor sleeve 32 is constructed of elastomeric materials and includes a central bore 42 which includes an inner surface 44. The relative dimensions of the diameter of inner surface 44 and the diameter of length 26 of insulation 18 are such that bore 42 will be dilated, when adaptor sleeve 32 is placed upon the cable and positioned as illustrated, and will grip the insulation with a fit tight enough to provide sufficient dielectric strength in the creep path along the outer surface of length 26 of insulation 18 between the termination 46 of the shield and the end 48 of the sleeve to assure that current will not pass between conductor 16 and shield 20 along insulation 18. Installation of each adaptor sleeve 32 is accomplished by pushing the sleeve over the cylindrical outer surface of length 26 of insulation 18, either manually or with the aid of a lever-type tool. Since the adaptor sleeves 32 ordinarily are relatively small, in comparison to housing 30, and have a relatively thinwalled construction, sufficient dilation of each bore 42 for installation of sleeves 32 can be accomplished in that manner.

Each adaptor sleeve 32 includes a first portion 50 of insulating elastomeric material, a second portion 52 of electrically conductive elastomeric material, and a third portion 54 of electrically conductive elastomeric material. Preferably, all of the portions are joined by being molded together so that the junctures 56 and 58 between the portions are continous and void-free. All of the portions 50, 52 and 54 have a common outer surface 59. Conductive portion 52 has a bore portion 60 which engages shield 20 and makes an electrical connection therewith.

Once the adaptor sleeves 32 are in place, the terminal portions 28 of the conductors 16 are permanently connected. One method of connection is to insert bared conductor portions 28 into ferrule 34 and permanently affix the ferrule to each conductor, as by crimping the ferrule to establish a connection at 63. Another method is to weld the conductor portions 28 together directly. Other connection methods are known to those skilled in the art.

After the conductor portions 28 are connected, heat transfer jacket 36 is placed over connection 63 and is secured in place between the terminal ends 48 of the adaptor sleeves 32. The heat transfer jacket 36 may be constructed in at least two parts which can be placed over connection 63 and joined together to complete the jacket. When properly placed, heat transfer jacket 36 has an outer surface 64 aligned axially with surfaces 59 of the adaptor sleeves 32.

Assembly of the splice connector 10 will be completed to establish the splice connection illustrated in FIG. 2 by pulling the housing 30 over the adaptor sleeves 32 and the heat transfer jacket 36, thus enclosing the connection 63 and jacket 36 within an envelope of insulation. The relative dimensions of the bore 40 of the housing 30 and the outer surfaces 59 and 64 of the sleeves 32 and jacket 36, respectively, are such that the bore 40 will be dilated and sufficient gripping forces will be established between the housing and the adaptor sleeves along interfaces 66 to effect the appropriate seals while imparting the necessary dielectric strength to the creep path along each interface 66 between the conductive portions 52 and 54 of each adaptor sleeve 32.

However, housing 30 is relatively large and the thickness of the wall of the generally tubular structure of housing 30 renders dilation of bore 40 rather difficult. Such assembly of the housing 30 with the adaptor sleeves 32 and the heat transfer jacket 36 to effect installation of the electrical connector 10 ordinarily would require high axial forces to be exerted upon the housing in order to overcome the resistance to movement of the housing, the resistance being engendered by the interference between the parts, the coefficient of friction between surface 41 of bore 40 and cylindrical outer surfaces 59 and 64, and the total area of the engaged surfaces 41, 59 and 64. Thus, pulling the housing over the adaptor sleeves and the heat transfer jacket can become a difficult chore where the splice connector is made large enough to effect a splice connection between cables which are to carry power at high voltages.

In order to facilitate assembly of housing 30 with adaptor sleeves 32 and jacket 36, housing 30 is provided with means for enabling the introduction of a fluid under pressure between the surface 41 of bore 40 and the outer surfaces 59 and 64 during installation. The effect of the fluid under pressure is to dilate surface 41 somewhat and establish a fluid layer between the surface 41 and surfaces 59 and 64, thus reducing the gripping forces between the juxtaposed surfaces and effecting a concomitant reduction of the axial forces necessary to install housing 30. As best seen in FIG. 1, such means includes a fitting 70 extending through the wall of the housing 30 adjacent one end 72 thereof and providing an internal passage 74 extending to the surface 41 of bore 40 to communicate with the interior of the housing. The fitting 70 includes a stem 76 having an external thread 78 and threaded into an annular base 80 secured in the elastomeric material of the wall of the housing, as by molding the housing about the base 80 (also see FIGS. 3 through 5).

When the housing 30 is to be moved from its position over cable 12 so as to be placed over the adaptor sleeves 32 and jacket 36, end 72 of the housing is placed over the nearest adaptor sleeve 32, as seen in FIG. 1. A source 82 of fluid under pressure is coupled to fitting 70 via a feed line 84 which feeds the fluid, under pressure, through passage 74 to the interface 66 between the juxtaposed surfaces 41 and 59. Sealing means in the housing at 86, between the passage 74 and the end 72, impedes the escape of fluid from the end 72 of the housing, causing the fluid to flow into bore 40 at the interface 66 and travel toward the opposite end 88 of the housing. Because the fluid is under pressure, bore 40 will tend to be enlarged. The concomitant dilation of surface 41 of the bore and the establishment of a fluid layer or film between surfaces 41 and 59 drastically reduces the gripping forces along the interface 66, thus enabling the housing to be advanced in the direction of arrow 90 with minimal axial force upon the housing.

Figure 5:
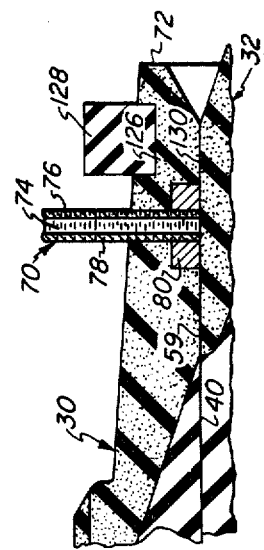
FIGS. 3 through 5 are enlarged fragmentary, cross-sectional views illustrating alternate constructions for a seal located in an electrical cable accessory constructed in accordance with the invention.
Figure 4:
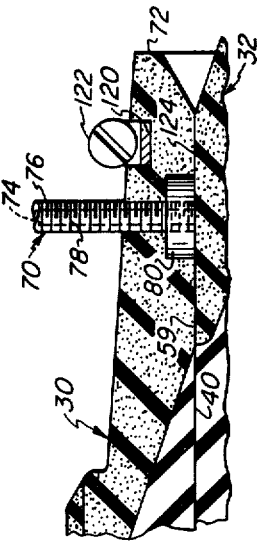
Figure 3:
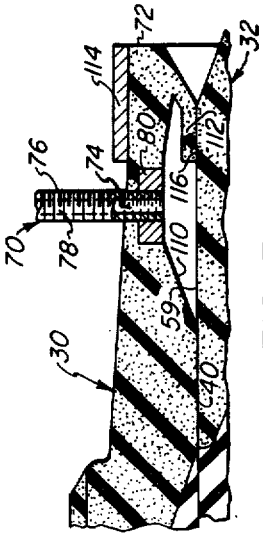

In the embodiment illustrated in FIG. 1, the sealing means at 86 is established by fabricating that portion 92 of the housing 30 between the fitting 70 and the end 72 of an elastomeric material having a higher modulus of elasticity than the remainder of the housing so that portion 94 of bore 40 does not dilate as readily as the remainder of the bore. Alternate sealing arrangements are illustrated in FIGS. 3 through 5, and will be described hereinafter.

The fluid supplied to feed line 84 may be a gaseous fluid, such as air or nitrogen, or it may be a liquid, such as oil. It has been found preferable to employ a fluid with good dielectric properties. One such fluid is a silicone oil which not only dilates the bore of the housing, but also lubricates the interface 66 to enhance the assembly procedure and provides the desired dielectric property. Examples of gaseous fluids which are appropriate for use in the present invention and which provide suitable dielectric properties are gaseous fluorocarbons and gaseous sulfur hexafluoride.

Once the housing is located in appropriate assembled position over the adaptor sleeves 32 and jacket 36, the feed of fluid under pressure is discontinued. Fluid in interface 66 will escape from end 88 of the housing and through the fitting 70, after disconnection of feed line 84, until the bore 40 contracts to enable surface 41 to grip outer surfaces 59 and 64 with the appropriate gripping forces. Stem 76 of the fitting 70 may be removed from base 80 by unthreading the stem from the base and the splice connection is complete, as shown in FIG. 2.

Electrical stresses within the splice connection are appropriately graded by providing the housing 30 with electrically conductive portions 100 at the ends thereof and a sleeve-like portion 102 of electrically conductive material contiguous with bore 40 intermediate the ends of the housing. Portions 100 and 102 are constructed of an electrically conductive elastomer. Portions 100 are electrically connected with corresponding portions 52 of adaptor sleeves 32 so as to enable a smooth transition in the pattern of electrical stresses extending from the termination 46 of each shield 20 along the splice connection from one end thereof toward the opposite end. An outer portion 104 of electrically conductive material provides a continuous shielding system across the splice connection between the shields 20 of the cables. Portion 102 is electrically connected to portions 54 of the adaptor sleeves 32 and to the connection 64 so as to place the interior portion of the splice connection, which lies within portion 102, within an envelope of essentially equal electrical potential and thereby eliminate deleterious stressing of voids within the splice connection, while providing the appropriate grading of the electrical stress pattern between the confronting ends of the adaptor sleeves 32. It is noted that base 80 is located within an electrically conductive portion 100. In this manner, the pattern of electrical stress in the housing remains undisturbed.

Turning now to the alternate sealing arrangements illustrated in FIGS. 3 through 5, the alternative construction shown in FIG. 3 includes an annular recess 110 communicating with bore 40 of housing 30 and located axially in position to communicate with the passage 74 in stem 76 of fitting 70. A lip 112 projects into the recess 110 and a supplementary band 114 of relatively rigid material reinforces the housing 30 at end 72 thereof. Upon supplying fluid under pressure through passage 74, recess 110 will be filled with fluid and the fluid will urge lip 112 radially inwardly against and outer surface 59 to establish a seal at 116. The reinforcing band 114 adds to the maintenance of the integrity of the seal.

In the sealing arrangement of FIG. 4, housing 30 is provided with a circumferential groove 120 adjacent end 72, between the fitting 70 and the end 72, and a selectively adjustable band clamp 122, such as a common hose clamp, is placed within the groove 120. Because the band clamp 122 is selectively adjustable, optimum sealing pressure can be obtained at 124 and selectively released, for purposes which will be explained in greater detail hereinafter.

In the embodiment illustrated in FIG. 5, housing 30 is provided with a circumferential groove 126 adjacent end 72, between the fitting 70 and the end 72, and a band 128 of elastomeric material is placed within the groove 126. Band 128 exerts radially inwardly directed forces to establish an appropriate seal at 130.

Referring now to FIG. 6, another splice connector 140 constructed in accordance with the invention is shown being assembled and installed in accordance with the invention at the terminal ends of a pair of high voltage electrical cables 142 and 144 which are constructed in the same manner as cables 12 and 14.

The component parts of the splice connector 140 include an outer housing 150 and a pair of adaptor sleeves 152. Unlike splice connector 10, connector 140 does not include a heat transfer jacket similar to jacket 36, and a gap 154 exists between the confronting ends 156 of adaptor sleeves 152.

Installation of the adaptor sleeves 152 is assisted by providing for the introduction of fluid under pressure into the central bore 158 of each adaptor sleeve through a passage 160 in a fitting 162 located adjacent end 164 of each adaptor sleeve 152. Fitting 162 includes a threaded stem 168 of a base 170, and a seal is provided at 172, between the fitting and the end 164. In this manner fluid supplied under pressure at fitting 162 will dilate the bore 158 and establish a fluid layer between the bore and outer cylindrical surface 174 of the cable over which the sleeve 152 is to be installed. Installation is carried out in the same manner as described above in connection with the installation of housing 30 in the assembly of splice connector 10. Upon completion of the installation of sleeves 152, at least one of the stems 168 is removed so as to enable placement of the housing 150 over the sleeves 152 and over the connection at 176.

Housing 150 is provided with a fitting 162 adjacent each end 178 of the housing and a seal 180 between each fitting 162 and a corresponding end 178. Each seal 180 is constructed similar to the arrangement illustrated in FIG. 4; that is, a circumferential groove 182 receives a selectively adjustable clamp 184 for selectively sealing or releasing the seal between each fitting 162 and corresponding end 178.

In this instance, housing 150 is provided with a rigid tube 186 inserted in bore 188 of the housing and held in place within the bore by an interference fit. Tube 186 is installed in the factory for the purpose of reinforcing the housing and maintaining the surface 190 of the bore 188 clean during shipping and handling of housing 150.

It is necessary to remove tube 186 when housing 150 is installed.

Housing 150 is installed by first placing one end 178 over a sleeve 152, as seen in FIG. 6, effecting a seal at 192, and then supplying fluid under pressure to the corresponding first fitting 162 via a feed line 194 coupled to the fitting. The fluid under pressure will dilate the bore 188 of the housing and establish a fluid layer between the surface 190 of bore 188 and the outer cylindrical surfaces 196 and 198 of the corresponding sleeve 152 and the tube 186, respectively, enabling the housing 150 to be moved in the direction of arrow 200 with relative ease. The tube 186 will abut a sleeve 152 at 202 and the housing 150 will slide from the tube.

When the housing 150 reaches the position indicated in phantom in FIG. 6 the seal at 192 will be ineffective and the fitting 162 will communicate with the gap 154 between the confronting ends 156 of the adaptor sleeves 152, thereby defeating the ability of the fluid supplied at the first fitting to dilate the bore 188 of the housing and to establish a fluid layer between the juxtaposed portions of surfaces 190, 196 and 198. At that point, fluid is supplied under pressure via feed line 204 to the second fitting 162 adjacent the other end 178 of housing 150 and the corresponding clamp 184 is closed to effect a seal at 206. Thus, fluid under pressure is again available between the surface 190 of bore 188 and the outer surfaces 196 and 198 and installation of housing 150 can be continued with minimal axial force.

When the housing 150 is advanced in the direction of arrow 200 to the position where the first fitting 162, which is coupled to feed line 194, passes beyond gap 154, a fluid layer can be established between the surface 190 of bore 188 and the outer surface 196 of both adaptor sleeves 152 by feeding fluid under pressure to both fittings 162 via both feed lines 194 and 204. In this manner, fluid assisted installation can continue until the housing 150 is appropriately positioned over both sleeves 152 and the splice connection is completed. Tube 186, which becomes fully released from the housing 150, may be retained on cable 142 for use in aiding any subsequent removal of housing 150, by reversing the above procedure, or may be cut away and discarded.

Referring now to FIG. 7, an electrical cable accessory in the form of a terminator 210, constructed in accordance with the invention, is shown installed at the terminus of electrical cable 212. Cable 212 has a central conductor 216 surrounded by insulation 218 which, in turn, is surrounded by a conductive shield 220.

Terminator 210 is fabricated of elastomeric material and includes a first portion 222 of insulating elastomer and a second portion 224 of conductive elastomer. An axial bore 226 extends through the terminator.

Installation of the terminator 210 upon cable 212 was accomplished in the manner described above. Fluid under pressure was introduced into bore 226 through a fitting 230 located adjacent end 232 of the terminator. A seal at 234 enabled dilation of bore 226 and the establishment of a fluid layer between the inner surface 236 of bore 226 of the generally tubular terminator 210 and the outer cylindrical surfaces 238 and 240 of the insulation 218 and shield 220, respectively, during installation of the terminator over the cable. The fluid assisted installation enables ease of assembly and accurate positioning of the terminator, despite the relatively thick wall construction of the terminator. After installation, the surface 236 of bore 226 grips the cable with the desired gripping force.

It is to be understood that the above detailed description of an embodiment of the invention is provided by way of example only. Various details of design and construction may be modified without departing from the true spirit and scope of the invention, as set forth in the appended claims.

The embodiments of the invention in which an exclusive property or privilege is claimed are defined as follows:

1. In an electrical cable accessory having a tubular member of elastomeric material which is to be installed over a cylindrical surface to grip the cylindrical surface, when in appropriate assembled relation therewith, with a predetermined gripping force established by dilation of the tubular member, said tubular member having opposite ends and a wall portion extending between said opposite ends, the improvement comprising:

means in the tubular member for enabling the introduction of fluid under pressure through said wall portion and between the tubular member and the cylindrical surface to reduce said gripping force during installation of the tubular member over the cylindrical surface; and means adjacent at least one end of the tubular member for impeding the escape of said fluid from between the tubular member and the cylindrical surface at said one end.

2. The invention of claim 1 wherein:

said means for enabling the introduction of fluid includes fluid-introduction means located adjacent said one end; and said means for impeding the escape of fluid includes sealing means between the fluid-introduction means and said one end.

3. The invention of claim 2 wherein the sealing means includes a selectively releasable seal.

4. The invention of claim 1 wherein:

said means for enabling the introduction of fluid includes fluid-introduction means located adjacent each of said opposite ends; and said means for impeding the escape of fluid includes sealing means between each fluid-introduction means and a corresponding one of said opposite ends.

5. The invention of claim 4 wherein each sealing means includes a selectively releasable seal.

6. The invention of claim 1 wherein the wall portion of said tubular member has an internal surface and an outside surface, said means for enabling introduction of a fluid under pressure including a passage between said internal surface and said outside surface for admitting the fluid from a source outside the wall and through the wall to enter between the inside surface and the cylindrical surface.

7. The invention of claim 6 wherein the passage is located adjacent said one end; and said means for impeding the escape of fluid includes sealing means between the passage and said one end.

8. The invention of claim 7 including a fitting passing through said wall and providing said passage, said fitting including a stem.

9. The invention of claim 8 wherein said stem is selectively removable.

10. The invention of claim 1 wherein the tubular member has an internal surface, an outside surface and a wall between the internal surface and the outside surface, said means for enabling introduction of a fluid under pressure including a passage located adjacent each of said opposite ends, each passage extending between said internal surface and said outside surface for admitting the fluid from a source outside the wall, through the wall and between the inside surface and the cylindrical surface, and said means for impeding the escape of fluid includes sealing means between each passage and a corresponding one of said opposite ends.

11. The invention of claim 10 wherein each sealing means includes a selectively releasable seal.

12. The invention of claim 11 including a fitting passing through said wall adjacent each said end, each fitting providing one of said passages and each fitting including a stem.

13. The invention of claim 12 wherein each stem is selectively removable.

14. In a method of installing an electrical cable accessory having a tubular member of elastomeric material which is to be installed over a cylindrical surface to grip the cylindrical surface, when in appropriate assembled relation therewith, with a predetermined gripping force established by dilation of the tubular member, said tubular member having opposite ends and a wall portion extending between said opposite ends, the improvement comprising:

introducing fluid under pressure through said wall portion and between the tubular member and the cylindrical surface as the tubular member is placed over the cylindrical surface; and simultaneously impeding the escape of said fluid from between the tubular member and the cylindrical surface at least at one of said opposite ends to dilate the tubular member and establish a fluid layer between the tubular member and the cylindrical surface, thereby reducing said gripping force during installation.

15. The method of claim 14 including:

introducing said fluid under pressure at a location adjacent said one of the opposite ends of the tubular member; and impeding the escape of said fluid under pressure by establishing a seal between said location and the one end, whereby said fluid under pressure will be urged toward the other of said opposite ends of the tubular member.

16. The method of claim 15 wherein said one of the opposite ends is the end first placed over the cylindrical surface.

17. The method of claim 16 including sealing the fluid introduced into the tubular member against escape from said one end as the one end is advanced along the cylindrical surface during installation.

18. The method of claim 17 including simultaneously enabling escape of said fluid under pressure adjacent the other of the opposite ends.

19. The method of claim 14 wherein the fluid is a liquid.

20. The method of claim 19 wherein the liquid is an oil having good dielectric properties, such as a silicone oil.

21. The method of claim 14 wherein the fluid is a gas.

22. The method of claim 21 wherein the gas is a gaseous fluorocarbon.

23. The method of claim 21 wherein the gas is gaseous sulfur hexafluoride.

24. The invention of claim 1 wherein said wall portion comprises electrically conductive material.

* * * * *